No. 734,150. PATENTED JULY 21, 1903.
A. J. WILSON.
LISTER ATTACHMENT.
APPLICATION FILED MAR. 25, 1903.
NO MODEL.
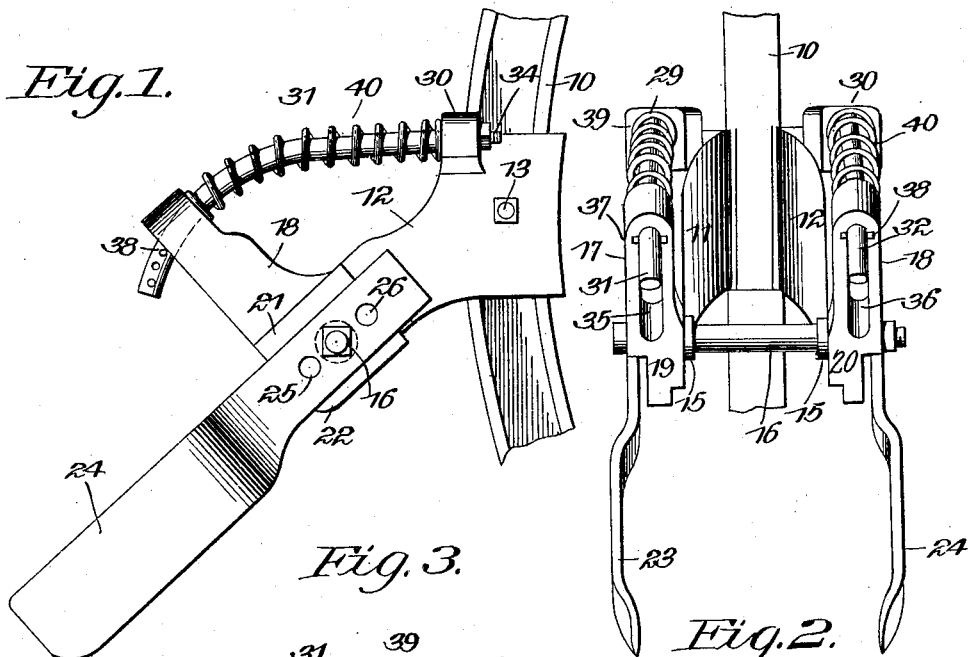
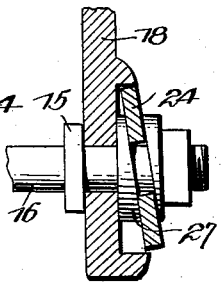
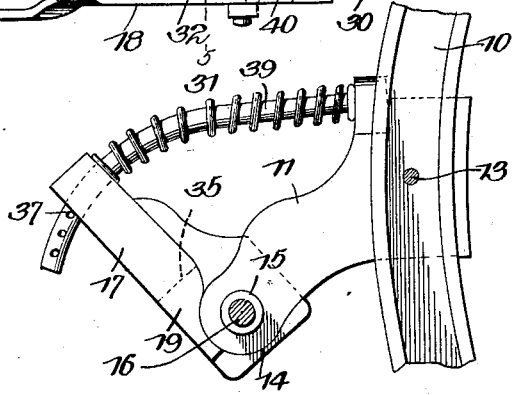

No. 734,150.

Patented July 21, 1903.

UNITED STATES PATENT OFFICE.

ANDREW JAMES WILSON, OF ONAGA, KANSAS.

LISTER ATTACHMENT.

SPECIFICATION forming part of Letters Patent No. 734,150, dated July 21, 1903.

Application filed March 25, 1903. Serial No. 149,541. (No model.)

*To all whom it may concern:*

Be it known that I, ANDREW JAMES WILSON, a citizen of the United States, residing at Onaga, in the county of Pottawatomie and State of Kansas, have invented a new and useful Lister Attachment, of which the following is a specification.

This invention relates to improvements in seed-planting machines, more particularly to the furrow-opening and seed-depositing parts of such machines, and has for its object to produce a simply-constructed and improved attachment whereby the seeds are uniformly covered.

Another object of the invention is to produce a device which may be adjusted to adapt it to the different conditions of the soil and the quality and form of seed to be planted and which may be adjusted to cover to any required depth and to operate at any required distance apart.

Other novel features of the invention will appear in the annexed description and be specified in the claims following.

In the drawings illustrative of the invention, in which corresponding parts are denoted by like designating characters, Figure 1 is a side view. Fig. 2 is a rear view. Fig. 3 is a plan view of the improved device attached to a section of a seed-planter beam. Fig. 4 is a longitudinal sectional elevation on the line 4 4 of Fig. 3. Fig. 5 represents a section taken on line 5 5 of Fig. 3.

The improved device may be attached to any of the various forms of seed-planters manufactured; but for the purpose of illustration it is shown applied to a section of a beam (indicated at 10) of a conventional form, the beam adapted to support any of the ordinary forms of furrow-openers and planter-pipes.

The improved device consists of two bracket members 11 12, attached, as by a single bolt 13, to opposite sides of the beam and extending rearwardly thereof and terminating in bearing-disks 14, as indicated. The brackets are formed "rights and lefts," as shown, curving outwardly in opposite directions and connected centrally through the disks 14 by a transverse bolt 16, the bolt having spaced shoulders 15 to enable it to serve as a "spreader" to maintain the brackets at the proper distance apart. The ends of the bolt 16 extend beyond the disks 14, and upon these ends standards 17 18 are rotatively mounted, the standards having sockets 19 20, engaging the disks, the disks and sockets thus forming a rule-joint-like coupling with the bolt 16 as a pivot. The outer surfaces of the standards 17 18 are provided with ribs 21 22, spaced apart upon equal sides of the bolt 16 and forming guides between which the upper ends of lister cover-blades 23 24 are adjustably supported, the lister-blade shanks having spaced apertures 25 26, by which they may be adjusted upon the bolt 16.

Between the lister-blade shanks and the outer surfaces of the disk portions 14 of the brackets washers 27 are placed around the bolt 16, the washers being thicker at one edge than the other, by which means the rear or free ends of the blades may be adjusted laterally to increase or decrease the distance apart, as will be obvious.

The upper ends of the brackets 11 12 will be provided with perforated hubs 29 30, in which rearwardly-extending curved rods 31 32 are supported, as by nuts 33 34, the opposite ends of the rods passing loosely through slots 35 36 in the standards, as shown, and held from forward movement, as by pins 37 38.

The rods 31 32 between the brackets and standards are surrounded by coiled springs 39 40, by which means the standards and their attached lister cover-blades are yieldably maintained in their outward or rearward position against the stop-pins 37 38 and are independently yieldable to avoid breakage on coming in contact with any abnormal obstruction.

The rods 31 32 will be provided with a plurality of spaced apertures for the pins 37 38, so that the standards may be adjusted relative to the rods, by which means the outer free ends of the lister cover-blades may be adjusted vertically, as will be obvious. By this means the lister cover-blades are independently supported yieldably relative to the brackets and independently adjustable relative to the standards, both transversely and laterally, as before stated, by means of the plurality of apertures 25 26 and wedge-shaped washers 27, to cause them to travel in any required direction relative to the beam and its attachments, so that they can be adapted to varying conditions of the soil and the different kinds of seed being planted.

The device may be applied upon riding or walking drills, and will be found particularly applicable to riding "listers" having "combing" drills.

The parts may be modified in minor particulars without departing from the principle of the invention or sacrificing any of its advantages.

Having thus described the invention, what I claim is—

1. In a device of the class described, the combination with the beam carrying the furrow-opener, of brackets attached rigidly to and extending rearwardly of the beam, spring-controlled standards movably connected to the free ends of said brackets and lister cover-blades carried by said standards and partaking of their movements, substantially as specified.

2. In a device of the class described, the combination with the beam carrying the furrow-opener, of brackets attached rigidly to and extending rearwardly of the beam and terminating in vertical disks, spring-controlled standards having sockets movably engaging said disks, and lister cover-blades carried by said standards and partaking of their movements, substantially as specified.

3. In a device of the class described, the combination with the beam carrying the furrow-opener, of brackets attached rigidly to and extending rearwardly of the beam, spring-controlled standards movably connected to the free ends of said brackets, lister cover-blades carried by said standards and partaking of their movements, and means for adjusting said lister cover-blades relative to said standards, substantially as described.

4. In a device of the class described, the combination with the beam carrying the furrow-opener, of brackets attached rigidly to and extending rearwardly of the beam and terminating in vertical disks, spring-controlled standards having sockets movably engaging said disks, a clamp-bolt connecting said standards to said brackets, and lister cover-blades carried by said standards and partaking of their movements, substantially as specified.

5. In a device of the class described, the combination with the beam carrying the furrow-opener, of brackets attached rigidly to and extending rearwardly of their beam, standards movably connected to the free ends of said brackets, springs between said standards and brackets and maintaining them yieldably in distended position, and lister cover-blades carried by said standards and partaking of their movements, substantially as specified.

6. In a device of the class described, the combination with the beam carrying the furrow-opener, of brackets attached rigidly to and extending rearwardly of the beam, standards connected movably to the free ends of said brackets, curved rods extending from said brackets through said standards and limiting the rearward movement thereof, springs between said standards and brackets and maintaining said standards yieldably in distended position, and lister cover-blades connected to said standards and partaking of their motion, substantially as specified.

7. In a device of the class described, the combination with the beam carrying the furrow-opener, of brackets attached rigidly to and extending rearwardly of the beam, standards connected movably to the free ends of said brackets, curved rods extending from said brackets through said standards and limiting the rearward movement thereof, springs surrounding said rods between said standards and brackets, and lister cover-blades carried by said standards and partaking of their movements, substantially as specified.

8. In a device of the class described, the combination with the beam carrying the furrow-opener, of brackets attached rigidly to and extending rearwardly of the beam, spring-controlled standards movably connected to the free ends of said brackets, lister cover-blades carried by said standards and partaking of their movements, and means for adjusting said lister cover-blades transversely relative to said standards.

9. In a device of the class described, the combination with the beam carrying the furrow-opener, of brackets attached rigidly to and extending rearwardly of the beam and terminating in vertical disks, spring-controlled standards having sockets movably engaging said disks, a clamp-bolt connecting said standards to said brackets, lister cover-blades engaging said bolts and secured thereto by the same nuts which secure the standards and brackets, substantially as specified.

10. In a device of the class described, the combination with the beam carrying the furrow-opener, of brackets attached rigidly to and extending rearwardly of the beam and terminating in vertical disks, spring-controlled standards having sockets movably engaging said disks, a clamp-bolt connecting said standards to said brackets, lister cover-blades engaging said bolts and secured thereto by the same nuts which secure the standards and brackets, and inclined washers upon said bolts between said lister cover-blades and standards, whereby said lister cover-blades are adjustable laterally relative to said standards, substantially as specified.

11. In a device of the class described, the combination with the beam carrying the furrow-opener, of brackets attached rigidly to the opposite sides and extending rearwardly of said beam, spring-controlled standards independently connected movably to the free ends of said brackets, a lister cover-blade carried by each of said standards and oppositely disposed and partaking of the movements of the standards, and means for independently adjusting said lister cover-blades relative to said standards, substantially as specified.

12. In a device of the class described, the combination with the beam carrying the furrow-opener, of brackets attached rigidly to the opposite sides and extending rearwardly of said beam, and terminating in circular disk-bearings, standards having sockets movably engaging said disks, a clamp-bolt connecting said oppositely-disposed disks and sockets, and a lister cover-blade carried by each of said standards and partaking of their movements, substantially as specified.

In testimony that I claim the foregoing as my own I have hereto affixed my signature in the presence of two witnesses.

ANDREW JAMES WILSON.

Witnesses:
R. WILSON,
M. S. KNOX.